Figure 1:
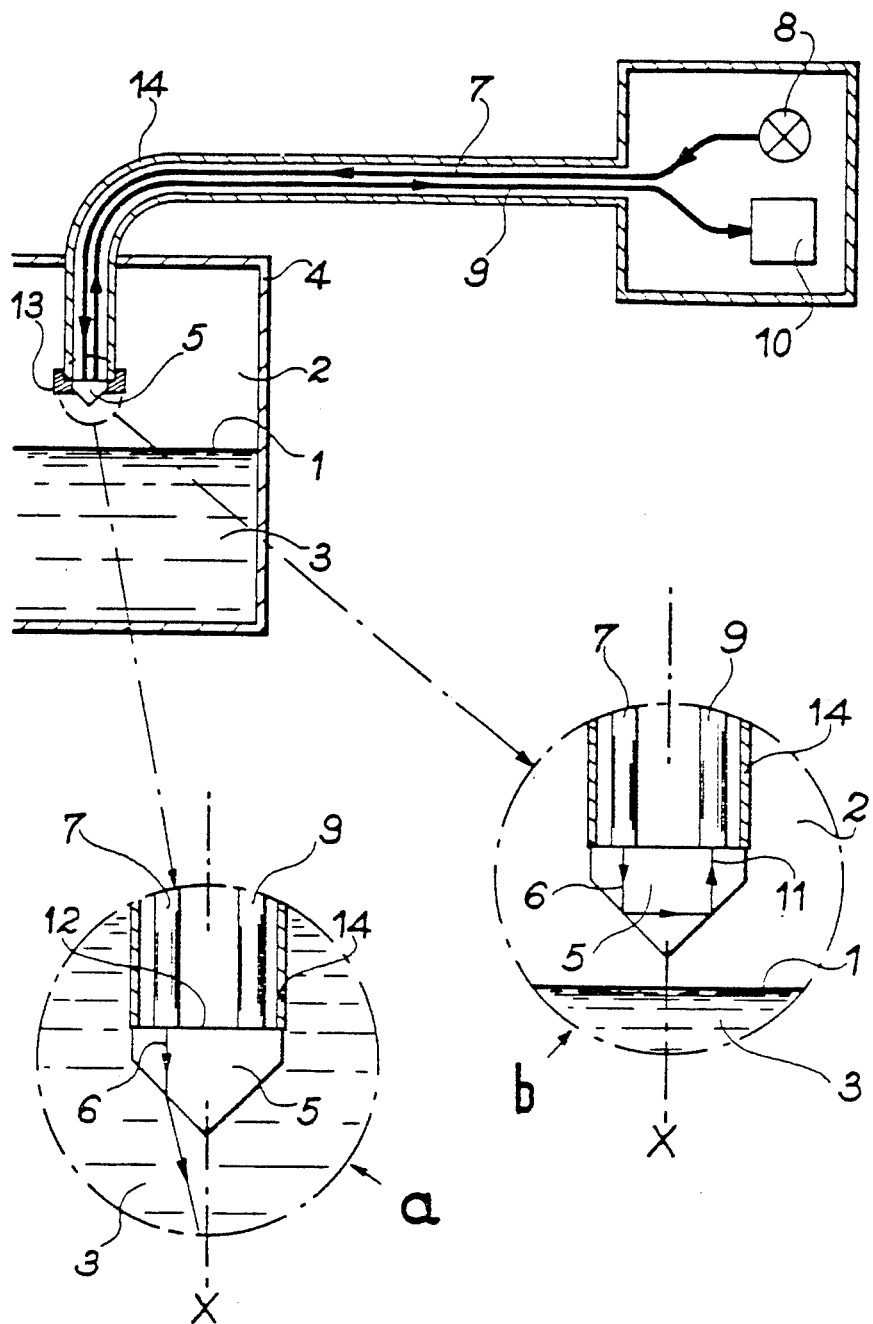

United States Patent [19]

Denis et al.

[11] Patent Number: 4,713,552
[45] Date of Patent: Dec. 15, 1987

[54] OPTICAL PROBE

[75] Inventors: Jean Denis, Mesnil le roi; Jean-Michel Decaudin, Velaux, both of France

[73] Assignee: Electricite de France (Service National), Paris, France

[21] Appl. No.: 694,388

[22] PCT Filed: Apr. 16, 1984

[86] PCT No.: PCT/FR84/00106
§ 371 Date: Dec. 24, 1984
§ 102(e) Date: Dec. 24, 1984

[87] PCT Pub. No.: WO84/04384
PCT Pub. Date: Nov. 8, 1984

[30] Foreign Application Priority Data

Apr. 22, 1983 [FR] France ................. 83 06672

[51] Int. Cl.[4] .............................. G01N 21/49
[52] U.S. Cl. ...................... 250/577; 73/293
[58] Field of Search .......... 73/293; 250/577; 356/133, 135, 136, 137

[56] References Cited

U.S. PATENT DOCUMENTS 3,834,235 9/1974 Bouton et al. .............. 73/293
4,286,464 9/1981 Tauber et al. .............. 73/293
4,304,462 12/1981 Baba et al. .............. 350/96.23

FOREIGN PATENT DOCUMENTS 3026411  2/1982  Fed. Rep. of Germany .
3247192  7/1984  Fed. Rep. of Germany ...... 250/577
0566220  2/1924  France .
2213487  8/1974  France .
58-18126 2/1983  Japan .
0404224  6/1966  Switzerland .
0615995  2/1980  Switzerland ...................... 250/577
2002905  9/1978  United Kingdom .

Primary Examiner—Eugene R. LaRoche
Assistant Examiner—Steven J. Mottola
Attorney, Agent, or Firm—Oblon, Fisher, Spivak, McClelland & Maier

[57] ABSTRACT

The invention relates to an optical probe comprising an optical means (5) having a given refractive index. This optical means is able to reflect an incident light beam if it is located in a medium (3), whose refractive index is higher than the given index and is able to reflect the incident light beam if it is in a medium (2), whose index is below the given index. The optical refraction or reflection means (5) is a cone of revolution, the axis (X) thereof being parallel to the incident beam (6) and to the optionally reflected beam (11), the base (12) of said cone receiving the incident light beam and is perpendicular to said incident light beam and to the possibly refracted beam. The cone and at least part of the optical fibres transmitting the incident and reflected light beams are located in a tight box or case. Application to the detection of interfaces of different media and to the determination of the components of a two-phase medium.

11 Claims, 3 Drawing Figures

OPTICAL PROBE

The present invention relates to an optical probe. This optical probe is used in the detection of the interface separating two media having different optical indices contained in an enclosure and more particularly to the detection of the level of the water in the enclosure of a nuclear power station steam generator. It also applies to the detection of the compositions of two-phase media on the basis of their optical refractive indices.

It is known that the detection of the separating interface of two media having different optical indices contained in an enclosure is difficult, particularly when the latter is sealed and the medium is hostile. This is for example the case that in steam generators in pressurized light water nuclear power stations, in which the water passage zone from the liquid phase to the vapour phase fluctuates and is not well known. Thus, it is also known that it is difficult to detect compositions of two-phase media contained in an enclosure.

The separating interface between two media having different optical indices and more particularly the level of the water in the enclosure of an e.g. steam generator can be defined, on the basis of the difference of static pressures recorded by a probe incorporating pressure detectors located at two different levels, on the same generatrix of the cylindrical enclosure of the generator. One of these detectors is positioned below the level of the water, whilst the other is positioned above said level in the part of the enclosure containing the steam. The pressure measurements can be disturbed in a temporary or permanent manner by secondary flow phenomena of the water between these two detectors. Moreover, the measurements obtained on the basis of these detectors can be relatively unreliable, in the case of an accidental depressurization of the generator.

Other probes making it possible to detect the separating interface of a liquid medium and a gaseous medium are known and a description will now be provided thereof.

Thermal probes are constituted by a system of heating elements. For example, the level of the water in a steam generator is detected by a measurement of the thermal conductivity of these heating elements, said conductivity varying as a function of the position of the heating element, which may be located within the liquid or outside it. These thermal probes are very quickly damaged by high temperature liquids and do not supply accurate measurements.

Electrical probes comprise a series of electrodes, the measurement of resistance variations between two successive electrodes giving a level indication. These probes are fragile and very sensitive to inteference.

Acoustic probes are often used for measuring liquid levels, but they are difficult to use in liquids having high temperatures, as well as in high pressure gases.

The operation of nuclear probes is based on the absorption of nuclear radiation in a liquid medium and rapidly become damaged at high temperatures.

The recent appearance of optical fibres and optoelectronic components has made it possible to develop optical probes for the detection of the separating interface between two media having different optical indices. These probes comprise an optical means generally constituted by a glass prism able to refract or reflect an incident light beam. This prism is placed in the enclousre containing two media having different refractive indices, e.g. a liquid and a gas. When the prism is located in the liquid, any incident light beam is refracted by the prism, whereas when the prism is located above the surface of the liquid, any incident light beam is reflected by the prism. An optical emission illuminated by a light source makes it possible to transmit an incident light beam up to the prism, whilst an optical reception fibre makes it possible to transmit the light beam, optionally reflected in the prism, to an optoelectronic detector. The presence or absence of reflected beams consequently makes it possible to detect the separating interface between the liquid and the gas and with the knowledge of the optical index of the material from which the prism is made, it is also possible to determine the composition of two two-phase media on the basis of their indices. If one of the media has an index higher than that of the prism, any incident beam is refracted. However, if one of the media has an index below that of the prism, any incident beam is reflected.

Optical probes are most frequently used but they suffer from disadvantages. The edge of the prism is fragile and the probe can easily become damaged. Moreover, in a thermally or chemically hostile medium, the glass constituting the prisms is easily subject to damage and the detection of interfaces then becomes impossible. The optical fibres used in these probes are not very well protected against high temperature liquids or against e.g. nuclear radiation. In general, these probes only have a single prism and do not make it possible to detect different interface levels. Finally, the orientation of the prisms with respect to incident light beams is critical and must be very accurate. The edge of the prism must be perpendicular to the plane containing the incident beam and the optionally reflected beam. Finally, when the probe has to be used in a hostile medium, the prism must be fixed to a tight box or case and this fixing causes sealing problems linked with the thermal stresses undergone by the prism.

The present invention is directed at obviating these disadvantages and more particularly at providing an optical probe comprising an optical means for the refraction or reflection of an incident beam, which does not have a fragile edge and which is made from a material which does not suffer deterioration in a thermally or chemically hostile medium. This probe also uses optical fibres, which are protected against high temperatures and radiation. As a result of the use of a plurality of optical refraction and reflection means, the probe according to the invention makes it possible to measure variable interface levels between media having different indices contained in an enclosure and which are particularly at a high temperature and are chemically hostile. The conical shape of the optical means makes it possible to easily solve the sealing problems during the fixing of said means to a case, by means of a tight cover, in the presence of thermal stresses.

The present invention relates to an optical probe for the detection of the separating interface of two hostile media having different optical indices contained in an enclosure, comprising a cone made from a transparent material and having a predetermined refractive index able to refract an incident light beam if it is located in one of the two media whose refractive index is higher than the predetermined index and is able to reflect an incident light beam if it is located in one of the two media whose index is below the predetermined index, by means of a pair of optical fibres comprising an optical emission fibre for transmitting the incident light beam from a light source to the base of the cone and at least one optical reception fibre for transmitting the optionally reflected beam to an optoelectronic detector, the source and the detector being located outside the enclosure, characterized in that it comprises a tight casing having a reception recess for a base of the cone, said casing being closed by a cover provided with a conical opening for the passage of the cone, the casing having tight passages for the optical fibres and maintaining in a given relative position with respect to the base of the cone two of the respective ends of the two optical fibres of the said pair, two other respective ends of said two fibres being respectively positioned facing the source and facing the detector, the casing and the cone being made from materials able to resist chemical and thermal stresses in the two media.

According to a feature, a gasket is placed between the base of the cone and the recess of the casing.

According to another feature, the axis of the cone is parallel to the incident beam and to the optionally reflected beam, the base of the cone receiving the incident beam and being perpendicular to the incident beam and to the optionally reflected beam.

According to another feature, the fibres are respectively surrounded by sheaths providing protection against thermal and chemical stresses of the two media.

According to another feature, the transparent material of the cone is corundum or diamond.

According to another feature, the probe comprises a plurality of cones of revolution respectively associated with pairs of optical fibres, the ends of the emission fibres being positioned facing one source or, respectively, facing a plurality of sources, each end of the reception fibres being positioned facing a detector.

According to another feature, the light source is a laser source.

According to another feature, each source of the plurality of sources is a light-emitting diode.

According to another feature, each optical fibre comprises a pure silica core surrounded by a fluorine-doped silica coating.

According to another feature, the protective sheath is made from stainless steel.

Finally, according to another feature, the optical probe of the invention is applicable to the detection of the level of water in the enclosure of a steam generator of a nuclear power station, or to the determination of the components of a two-phase medium.

The features and advantages of the invention can be better gathered from the following description with reference to the attached drawings, wherein show:

FIG. 1 diagrammatically, an optical probe according to the invention.

Figure 2:
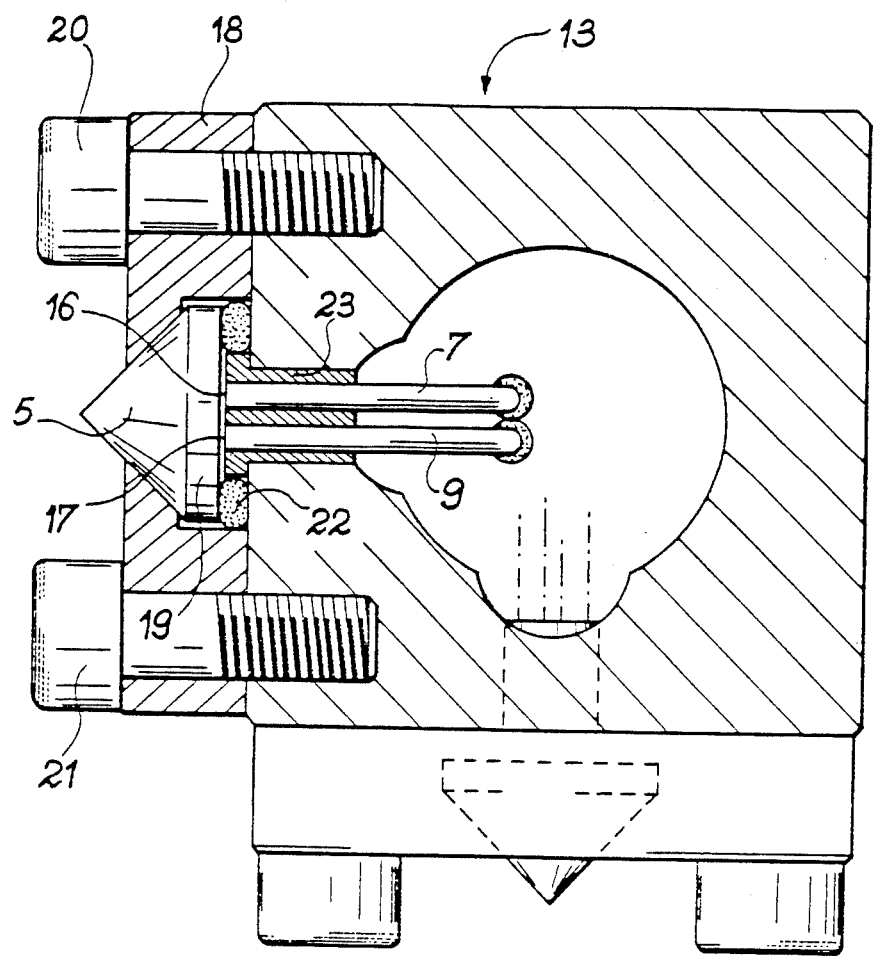

FIG. 2 diagrammatically, and in section, the installation box for the optical refraction or reflection means used in the probe according to the invention.

Figure 3:
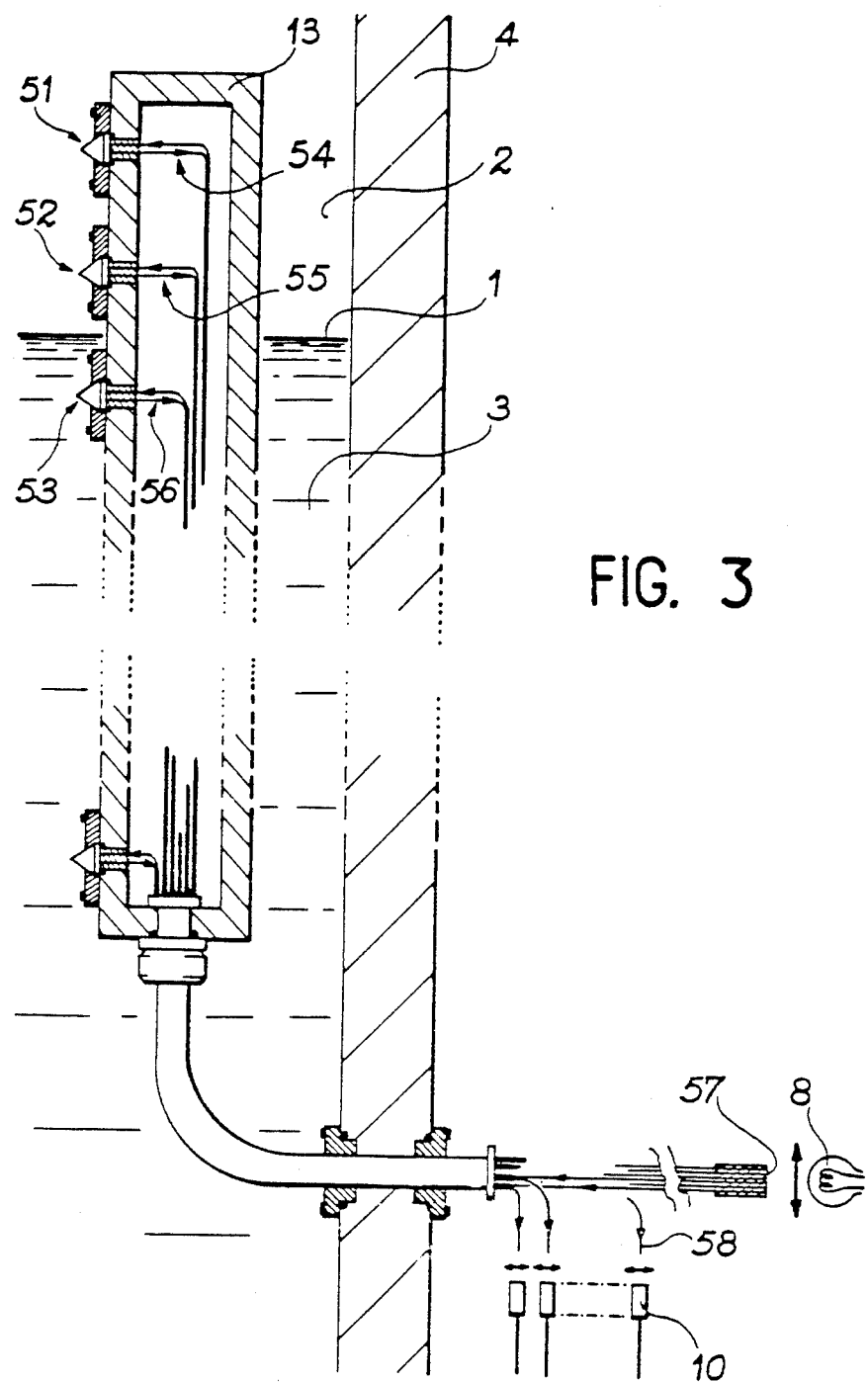

FIG. 3 diagrammatically, a probe according to the invention in which are used a plurality of optical refraction or reflection means.

FIG. 1 diagrammatically shows an optical probe according to the invention which, as will be shown in greater detail hereinafter, makes it possible to detect the separating interface 1 of two media 2, 3 having different refractive indices and contained in an enclosure 4 and they can be e.g. respectively gaseous and liquid.

It can also make it possible to detemine the components of a two-phase medium from the respective optical indices of these components. It comprises an optical means 5 for the refraction or reflection of the incident beam. This conical means will be described in greater detail hereinafter and is positioned in enclosure 4. This optical means 5, which has a predetermined refractive index, is able to refract an incident light beam 6, when it is located in the component whose index is higher than the predetermined index, as shown in a larger scale view a of the end of the probe.

In the embodiment shown in this drawing, the medium is e.g. the water of a nuclear power station steam generator. In the present case, the water is demineralised at high temperature, has a neutral pH and contains ammonia. It behaves in the same way as an acid. This optical means is also able to reflect an incident beam 6, when located in the component whose index is lower than the predetermined index. In the embodiment shown in the drawing, this component is gaseous (e.g. water vapour+ammonia). It is shown at 2 in the drawing, above the surface 1 of the liquid medium 3, as shown by the larger scale view b of the end of the probe. The probe also comprises a means 7 for transmitting the incident light beam from a light source 8 to the optical refraction or reflection means and a means 9 for transmitting the light beam, optionally reflected by optical means 5, to an optoelectronic detector 10. The optical refraction or reflection means 5 is a cone made from a material which is transparent to the light beams of source 8. This material can be diamond or corundum ($Al_2O_3$), whose refractive index is close to 1.7. The axis X of this cone is parallel to the incident beam 6, as well as to the optionally reflected beam 11. The base 12 of the cone receives the incident light beam, as will be shown in greater detail hereinafter. For example, light source 8 can comprise a laser of the helium-neon type or any other means producing intense light beams, e.g. a light-emitting diode. The cone can have a circular or elliptical base for example, its axis being perpendicular to the base.

In the embodiment shown in the drawing and as stated hereinbefore, enclosure 4 can e.g. be a nuclear power station steam generator, the liquid medium 3 being water mixed with ammonia at a temperature close to 300° C. The gasesous medium 2 consists of water vapour mixed with ammonia. In this case, the probe makes it possible to determine the level of the liquid in the enclosure. It is also possible to see a tight box or casing 13 for fixing the optical means 5 (to be described hereinafter), as well as a tight sheath 14 (preferably made from stainless steel) for protecting the optical transmission means 7, 9 against thermal and chemical stresses. The transmission means comprise a pair of optical fibres incorporating an emission fibre 7 for the instant light beams emitted by source 8 and an optical fibre 9 for the reception of beam 11, which has optionally been reflected by optical means 5. In the case where the probe is intended to detect the level of the water in the steam generator of a nuclear installtion, the optical fibres must be able to withstand temperatures close to 300° C., in the presence of radiation. For this particular application, these fibres have a pure silica core surrounded by a fluorine-doped silica protective coating. The latter makes it possible to protect the fibre core against the effects of radiation (particularly in a nuclear location). It also aids the good mechanical performance of the fibre when the latter has to be curved in order to follow a given path. This doped silica coating is itself surrounded by an e.g. polyamide coating, which reinforces the mechanical behaviour of the fibre.

FIG. 2 diagrammatically shows in section the end of the probe according to the invention, in the vicinity of the refraction or reflection cone 5 and in the vicinity of ends 16, 17 of optical fibres 7, 9 making it possible to transmit an incident beam to cone 5 or transmit a beam reflected by said cone towards a not shown detector. It is possible to see a tight casing 13 holding the cone 5 by means of a cover 18, provided with an opening. The cone has a base 19 permitting its fitting on casing 13 by means of the cover 18, secured by screws 20, 21. The base 19 of cone 5 rests on casing 13 via a gasket 22 (preferably a spring joint). The optical fibres 7, 9, which are assumed to be surrounded by their protective sheath, pass through casing 13 and, facing the base of cone 5, their ends 16, 17 are held in a given relative position by means of a sleeve 23. The two other ends of the optical fibres are not shown in this drawing. The two other ends are respectively positioned facing the light source 8 and facing the detector 10. As was stated hereinbefore, the portions of the optical fibres located in enclosure 4 on passing through said enclosure (FIG. 1) are surrounded by the tight protective sheath, which is preferably made from stainless steel when the medium is hostile. The conical shape of optical means 5, whose base rests on a gasket 22 ensures an excellent sealing of the casing, particularly when the probe is used in a high temperature medium and its elements are exposed to all expansion stresses. As cone 5 is of revolution, it is easy to position, whereas it is difficult to position a prism.

FIG. 3 diagrammatically shows another embodiment of the probe according to the invention. The same elements carry the same references in this and the other drawings. This probe is placed in an enclosure 4, which can e.g. be that of a steam generator containing water 3 and steam 2, the level of the water surface being designated as 1. In this embodiment, the probe comprises a plurality of refraction or reflection revolution cones 51, 52, 53, etc., respectively associated with pairs of optical fibres 54, 55, 56, etc. Two of the ends of the fibres of each pair are positioned facing each cone 51. The other ends 57 of the emission fibres are positioned facing a source 8, e.g. a laser which simultaneously illuminates all these other ends, or a plurality of sources such as light-emitting diodes, each diode illuminating one fibre. Each of the ends 58 of the reflection fibres is fixed facing a detector 10. In this embodiment, the cones are mounted in a casing in the same way as described hereinbefore, which has a cover provided with a plurality of openings for fixing the cones to the casing. As a result of this probe, it is possible to follow the variations in the level 1 of water 3 in enclosure 4. The detectors 10 positioned facing the ends 58 of the reception fibres corresponding to cones positioned above the level 1 of water 3, receive a light signal, whilst all the detectors positioned facing the ends of the fibres corresponding to cones immersed below the level 1 receive no light signal. In this embodiment, the probe makes it possible to detect the separating interface between two media having different optical indices. It also makes it possible to follow the variations in the level of said interface. It is also possible to consider choosing cones having different refractive indices for determining the composition or evolution of the composition of a two-phase medium. Thus, refraction or reflection takes place by a cone, as a function of whether its optical index is above or below the components surrounding it.

The ends of the refraction or reflection cones may optionally be truncated, without prejudicing the operation of the probe.

We claim:

1. Optical probe for the detection of the separating interface of two hostile media having different optical indices contained in an enclosure, comprising a cone made from a transparent material and having a predetermined refractive index able to refract an incident light beam if it is located in one of the two media whose refractive index is higher than the predetermined index and is able to reflect an incident light beam if it is located in one of the two media whose index is below the predetermined index, by means of a pair of optical fibres comprising an optical emission fibre for transmitting the incident light beam from a light source to the base of the cone and at least one optical reception fibre for transmitting the optionally reflected beam to an optoelectronic detector, the source and the detector being located outside the enclosure, characterized in that it comprises a tight casing having a reception recess for a base of the cone, said casing being closed by a cover provided with a conical opening for the passage of the cone, the casing having tight passages for the optical fibres and maintaining in a given relative position with respect to the base of the cone two of the respective ends of the two optical fibres of the said pair, two other respective ends of said two fibres being respectively positioned facing the source and facing the detector, the casing and the cone being made from materials able to resist chemical and thermal stresses in the two media.

2. Optical probe according to claim 1, characterized in that a gasket is placed between the base of the cone and the recess of the casing.

3. Optical probe according to claim 2, characterized in that the axis of the cone is parallel to the instant beam and to the optionally reflected beam, the base of the cone receiving the incident beam being perpendicular to the incident beam and to the optionally reflected beam.

4. Probe according to claim 3, characterized in that the fibres are respectively surrounded by sheaths providing protection against the thermal and chemical stresses of the two media.

5. Optical probe according to claim 3, characterized in that the transparent material is diamond.

6. Optical probe according to claim 3, characterized in that it comprises a plurality of said cones of revolution, respectively associated with pairs of optical fibres, the ends of the emission fibres being positioned facing at least one source each end of the reception fibres being positioned facing a detector, the fixing cover having a plurality of openings for the passage of said cones.

7. Optical probe according to claim 6, characterized in that the light source is a laser source.

8. Optical probe according to claim 6, characterized in that each optical fibres comprises a central pure silica core surrounded by a fluorine-doped silica coating.

9. Optical probe accordng to claim 8, characterized in that the sheath is made from stainless steel.

10. Optical probe according to claim 3, characterized in that the transparent material is corundum.

11. Optical probe according to claim 6, characterized in that the light source is a light emitting diode.

* * * * *